US008855960B2

(12) United States Patent
Holl et al.

(10) Patent No.: US 8,855,960 B2
(45) Date of Patent: Oct. 7, 2014

(54) DEVICE AND METHOD FOR TESTING SENSORS

(75) Inventors: Norbert Holl, Germering (DE); Bernd Wunderer, München (DE)

(73) Assignee: Giesecke & Devrient GmbH, Munich (DE)

( * ) Notice: Subject to any disclaimer, the term of this patent is extended or adjusted under 35 U.S.C. 154(b) by 1132 days.

(21) Appl. No.: 11/988,035

(22) PCT Filed: Jun. 28, 2006

(86) PCT No.: PCT/EP2006/006252

§ 371 (c)(1), (2), (4) Date: Apr. 30, 2008

(87) PCT Pub. No.: WO2007/000336

PCT Pub. Date: Jan. 4, 2007

(65) Prior Publication Data

US 2009/0132195 A1 May 21, 2009

(30) Foreign Application Priority Data

Jun. 29, 2005 (DE) ......................... 10 2005 030 289

(51) Int. Cl.
*G01C 25/00* (2006.01)
*G07D 7/00* (2006.01)

(52) U.S. Cl.
CPC ........................................ *G07D 7/00* (2013.01)
USPC ............................................ 702/116; 702/85

(58) Field of Classification Search
USPC ............. 702/85, 116; 209/534; 382/112, 135, 382/162
See application file for complete search history.

(56) References Cited

U.S. PATENT DOCUMENTS

| | | | | |
|---|---|---|---|---|
| 6,304,826 | B1 * | 10/2001 | Liu | 702/104 |
| 6,439,395 | B1 | 8/2002 | Voellmer et al. | |
| 6,547,151 | B1 * | 4/2003 | Baldi | 235/492 |
| 6,772,886 | B2 | 8/2004 | Werner et al. | |
| 7,103,438 | B2 * | 9/2006 | Hallowell et al. | 700/116 |
| 7,104,383 | B1 * | 9/2006 | Saltsov et al. | 194/206 |
| 7,325,205 | B2 * | 1/2008 | Duvel et al. | 715/835 |
| 2005/0161501 | A1 | 7/2005 | Giering et al. | |

FOREIGN PATENT DOCUMENTS

| | | | |
|---|---|---|---|
| DE | 101 63 266 | A1 | 7/2003 |
| DE | 101 63 267 | A1 | 7/2003 |
| DE | 103 17 257 | A1 | 11/2004 |
| EP | 0 731 737 | B1 | 9/1996 |
| WO | WO 03/036572 | A2 | 5/2003 |
| WO | WO 2004/088598 | A | 10/2004 |

OTHER PUBLICATIONS

Search Report of German Patent Office regarding German Patent Application No. 10 2005 030 289 0, Mar. 10, 2006.
English Translation of WO 03/036572 A2 (Giesecke & Devrient GmbH).

* cited by examiner

*Primary Examiner* — Elias Desta
(74) *Attorney, Agent, or Firm* — Workman Nydegger

(57) ABSTRACT

An apparatus and a method for testing of sensors for documents of value and a pertinent test medium. A test medium (1) having an electronic data memory (7) for data is provided, the data being used for testing the sensor (11). The data are transmitted from the test medium to a test device (12), which tests the sensor in dependence on the transmitted data.

8 Claims, 2 Drawing Sheets

DEVICE AND METHOD FOR TESTING SENSORS

BACKGROUND OF THE INVENTION

A. Field

The invention relates to an apparatus and a method for testing of sensors for documents of value and a pertinent test medium.

B. Related Art

Apparatuses for processing documents of value in particular are required for processing bank notes, in order to for example check bank notes as to special authenticity features and quality properties. Forgeries and bank notes worn out by use are sorted out. Apparatuses for processing documents of value in principle can also be used for checking any other type of documents of value, for example for checking identity documents, credit cards, check cards, tickets and the like.

Checking the documents of value is effected with the help of a plurality of different sensors depending on the value document property to be checked. The sensors are checked at temporal intervals with respect to their correct functional ability, adjustment and/or calibration. Such a check usually is carried out with the help of special test media. "Test media" within the meaning of the present invention are such aids for checking the functional ability, adjusting and/or calibrating which have defined reference properties measurable by the sensors to be tested.

Such test media are known e.g. from EP 0731737 B1 or WO 03/036572 A2.

According to EP 0731737 B1 a reference device with optical reference surface is provided for calibrating an optical sensor for documents of value, the reference surface being displaceably mounted in relation to the optical sensor, so that different areas of the reference surface can be measured.

This reference device is an integral part of a checking device for documents of value and therefore cannot be used for other checking devices.

According to WO 03/036572 A2 functionally testing, adjusting and/or calibrating the sensors of a bank note processing apparatus is effected with the help of test media, which for checking, adjusting and/or calibrating one or a plurality of sensors bear specific features, which the bank note processing apparatus, however, recognizes and differentiates only through a machine-readable identification. In the bank note processing apparatus are stored pieces of information for each identification about which sensor with respect to which property is to be checked, adjusted and/or calibrated with the help of the test medium. Additionally, the measured sensor data concretely determined in the test runs are compared with measured sensor data which were determined in earlier test runs and/or when putting into operation the bank note processing apparatus, in order to determine a trend of the sensor properties and to be able to replace the sensor in time.

These test media, too, cannot readily be used in other bank note checking apparatuses, because in other bank note checking apparatuses, too, the respective pieces of information pertinent to the identification must be stored, namely which sensor with respect to which property is to be tested with the help of the respective test medium.

It is therefore the problem of the present invention to provide an apparatus and a method for testing of sensors for documents of value and a pertinent test medium, which permit a simple use of the test media even for testing different sensors.

BRIEF SUMMARY OF THE INVENTION

The test medium for testing, in particular for functionally testing, adjusting and/or calibrating at least one sensor for documents of value in particular has the electronic data memory with data stored therein which are usable for testing the sensor. For transmitting data from the electronic data memory to a test device of the sensor and optionally from the test device to the electronic data memory, the test medium is further provided with at least one data interface.

According to the invention a test medium having an electronic data memory for data is provided, the data being used for testing the sensor. The data are transmitted from the test medium to a test device, which tests the sensor in dependence on the transmitted data.

In this way the test medium can also be used for different sensors without problems or for sensors in different apparatuses for processing documents of value. If the data memory of the test medium for example contains the entire or parts of the test algorithm and/or pertinent test parameters, after the transmission of these data from the test medium the test device can carry out exactly the test for which the respective test medium is determined. With that a definite association of the test procedure with the test medium used is ensured.

In contrast to WO 03/036572 A2, moreover, it is not necessary that in all different apparatuses for processing documents of value, in which the test medium can be employed, the respective test algorithms and/or pertinent test parameters are stored and kept up to date. This can be effected according to the invention e.g. by updating only those data, which are stored in the electronic data memory of the test medium.

Particularly preferably, the test medium can have a bank note, in particular a bank note suitable for the normal circulation of money, on or in which the data memory is applied or incorporated. This data memory then is connected with the data interface.

With that the handling of the test media becomes simple and less error-prone.

DESCRIPTION OF THE DRAWINGS

In the following the invention is further explained with reference to the accompanying Figures.

FIG. 1 shows an apparatus 10 according to the invention with at least one sensor 11 for bank notes and a device 12 for testing, in particular for functionally testing, adjusting and/or calibrating the sensor 11 with the help of a test medium 1 according to the invention. Apparatus 10 can be part of a bank note processing apparatus, which can have still further components not depicted, such as a singler for bank-note bundles, a bank note transport for the singled bank notes and one or a plurality of deposits for the bank notes checked by sensor 11. Such bank note processing apparatuses are known in a wide variety and therefore not further described. Concerning this, only by way of example, reference is made to U.S. Pat. No. 6,772,886 B2 or U.S. Pat. No. 6,439,395 B1 of the applicant.

Alternatively, sensor 11 and/or test device 12 can also be separate components, which are not part of a bank note processing apparatus or are removed from it for test purposes.

Figure 1:
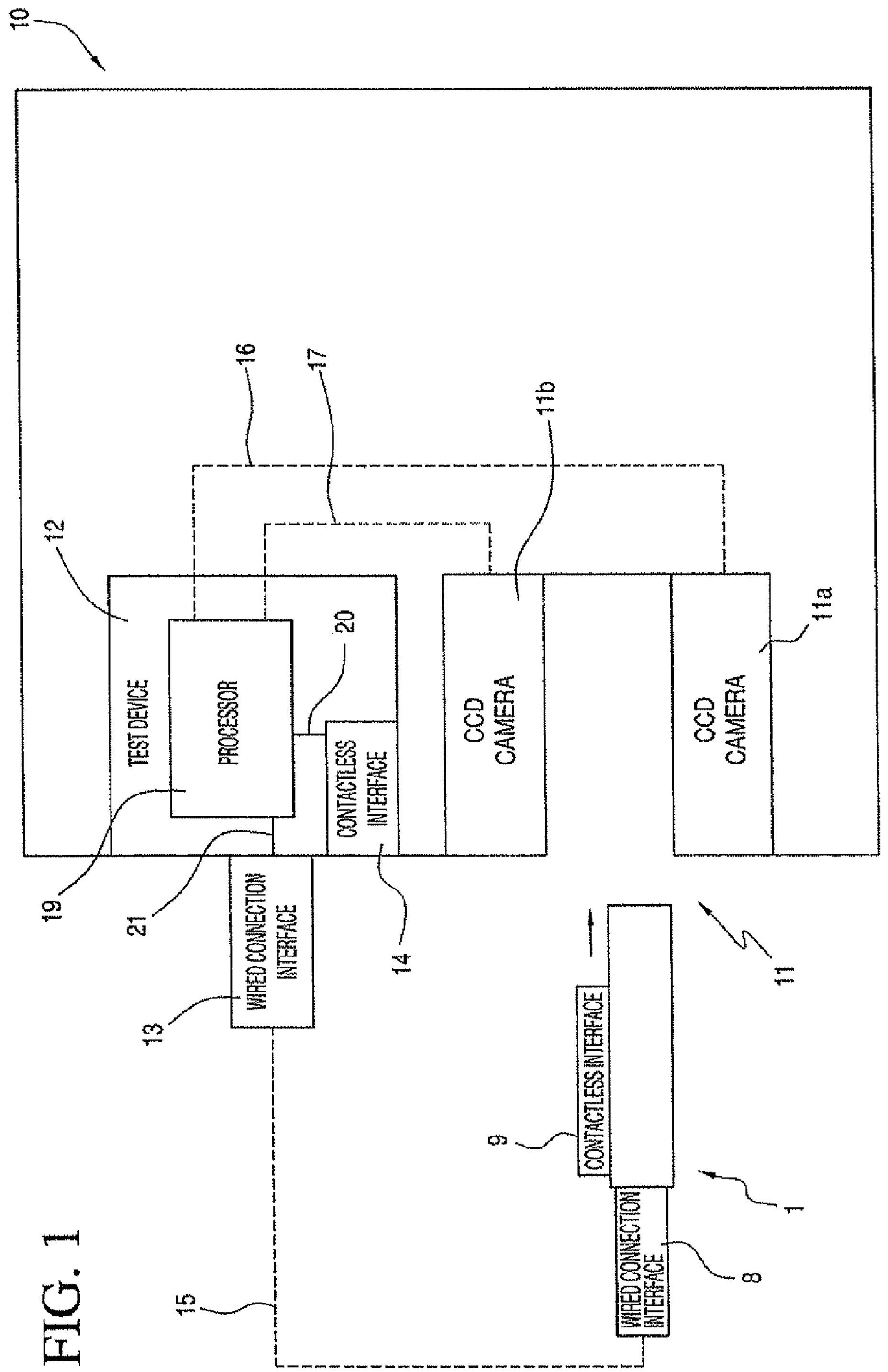
FIG. 1 shows a schematic cross-sectional view onto an apparatus with sensor, test device and test medium according to the present invention.

The sensor 11 to be tested can also be any one of the usual bank note sensors, which are used e.g. for measuring optical, magnetic or electrical properties of the bank notes in order to check their authenticity and state of wear. FIG. 1 only by way of example shows such a sensor 11 in the form of an optical image sensor 11 with two CCD cameras 11*a*, 11*b* disposed on opposite sides of the plane to be checked for recording of front and back side images of the bank notes to be checked.

Apparatus 10 in particular is characterized in that test device 12 has data interfaces 13, 14 for receiving data from test medium 1 and/or for passing on data to test medium 1. These interfaces for example can be a contactless interface 14, e.g. for an infrared or radio link. Alternatively or additionally, there can also be provided an interface 13 for the wired connection of the test medium 1, such as e.g. with the help of a standardized USB cable connection or the like. Furthermore, test device 12 has a computer processor 19, which via data lines 16, 17, 20, 21 is connected with the CCD cameras 11*a*, 11*b* and the interfaces 14 and 13, respectively.

Here test device 12 has the function of carrying out the tests, i.e. functionally testing, adjusting and/or calibrating the sensor 11 in dependence on the data of the test medium 1 transmitted via interfaces 13 and/or 14. Here test device 12 at the same time can have the function of an evaluation device of the sensor 11 or the pertinent bank note processing apparatus, so that when checking bank notes it can evaluate e.g. the measured data of the sensor 11 and judge the authenticity and/or the state of the checked bank notes.

Figure 2:
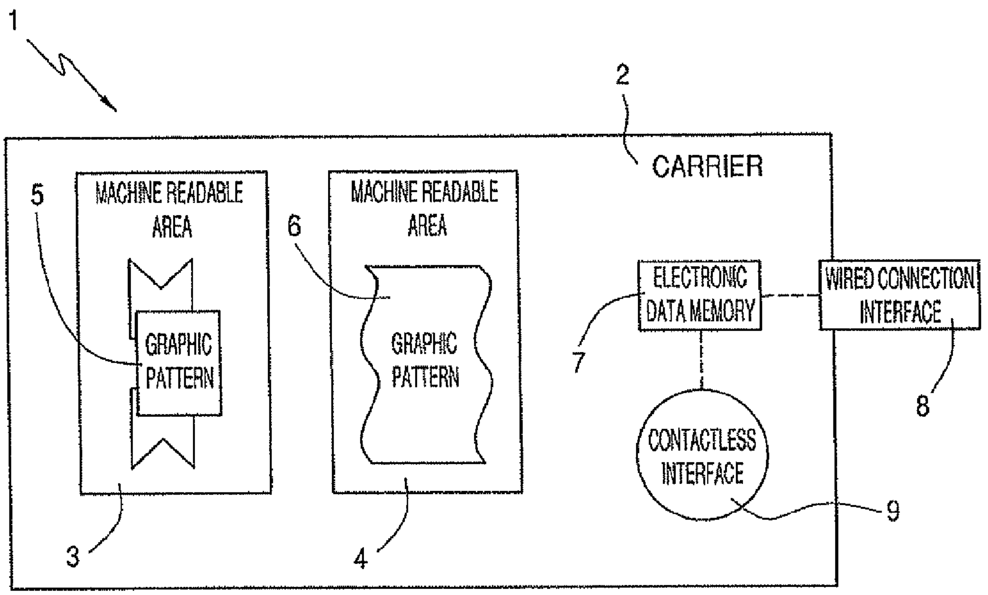
FIG. 2 shows a schematic view onto a test card as a test medium according to the present invention.

Test medium 1 for testing, in particular for functionally testing, adjusting and/or calibrating the sensor 11 is illustrated in more detail in FIG. 2. Test medium 1 has a card body or a sheet-shaped carrier 2, which only by way of example has two areas 3 and 4 with different machine readable properties, which can be measured and checked by the sensors 11 to be tested. The two areas 3 and 4 have e.g. different graphic patterns 5 or 6, which can be measured by the image sensor 11. Such areas can also be provided on the back of the test medium 1. Depending on the sensor to be tested the test medium can also have other optical, magnetic, electrical checkable features, such as e.g. luminescent feature substances or the like.

Test medium 1 is characterized in that test medium 1 has an electronic data memory 7 for data which are used for testing sensor 11, and test medium 1 further has at least one, in the present case two data interfaces 8, 9 for transferring data from the electronic data memory 7 to the test device 12 of the sensor 11.

The electronic data memory 7 can be any data memory, but an EPROM or flash memory is preferably employed. Furthermore, the data interfaces of the test medium 1 like the complementary data interfaces of the test device 12 can comprise a contactless interface 9, e.g. for an infrared or radio link, and/or an interface 8 for the wired connection of the test medium 1 to the data interface 13 of the test device 11. The presence of the two interfaces 8, 9 has the advantage, that the test medium 1 can be flexibly employed for apparatuses with different interfaces.

The data, which is stored in the data memory 7 of the test medium 1 and which is to be transmitted to the test device 12 e.g. can specify, which at least one property of the sensor 11 is to be tested with the help of the test medium 1 and/or with which test algorithms and/or test parameters the test algorithms are to be automatically executed and/or which sensors 11 were already checked with the test medium 1 in the past and/or with which result which sensors 11 were already checked with the test medium 1 in the past.

Preferably the data can also comprise the entire or at least parts of the test algorithms and/or test parameters, which are used for testing the sensor 11.

For testing, i.e. for functionally testing, adjusting and/or calibrating the sensor 11 the test medium 1 is now connected with test device 12 e.g. via a USB cable 15 and/or a contactless radio link between the interfaces 9 and 14. Data stored in data memory 7 are transmitted to the processor 19 of the test device 12 via these data lines. After the test medium having been automatically or manually moved into the measuring area of the sensor 11 to be tested, i.e. in the area between the two CCD cameras 11*a, b*, the test process is started. Here the tests can run as described in detail in the above-mentioned prior art and are effected in dependence on the transmitted data.

Thereafter, data about the executed sensor test can be transmitted from processor 19 of the test device 12 to the test medium 1 and stored in the electronic data memory 7 of the test medium 1.

Figure 3:
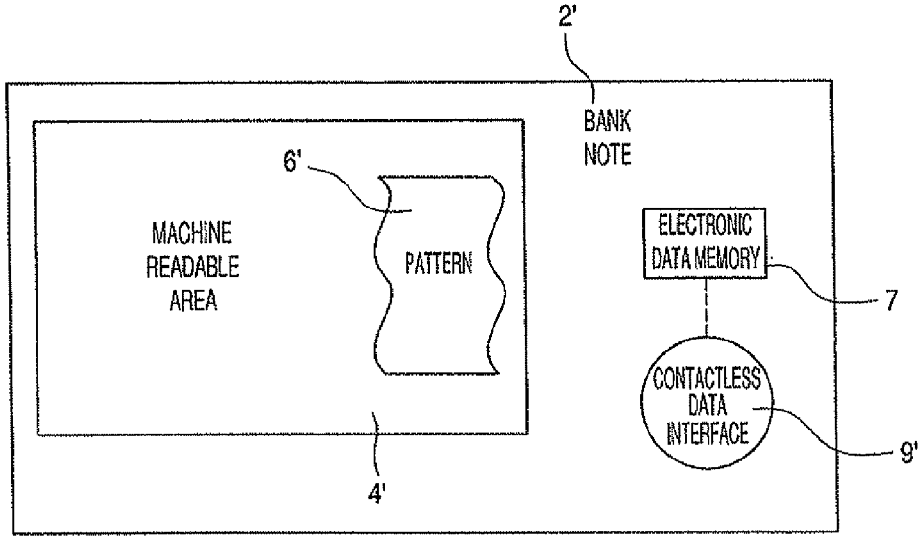
FIG. 3 shows a schematic representation of a test medium in the form of a bank note with an electronic data memory applied thereon.

A further preferred embodiment of a test medium according to the invention is a bank note 2' schematically illustrated in FIG. 3, as it is in circulation or could be in circulation, for example a Euro bank note or a US-dollar bank note, as a carrier with an electronic data memory 7 applied thereon or incorporated therein. Bank note 2' is additionally provided with the data memory 7 applied thereon, which is formed as in the first embodiment. In contrast to the first embodiment now only one contactless data interface 9' is provided, which is connected with the data memory 7 and serves for transmitting data from the data memory 7 to the test device, which is provided with a corresponding complementary data interface. Preferably, data memory 7 and data interface 9' are realized by an RFID.

For producing an optical property of the bank note 2' in an area 4' of the bank note a pattern 6' is printed which consists of substances only represented by a symbol in FIG. 3, which absorb incident visible radiation and emit it as infrared fluorescence radiation, so that a property of the bank note 2' is the respective fluorescence ability. The sensor of the test device can now be provided with a light source for illuminating the bank note 2' with visible radiation and a detector for detecting infrared fluorescence radiation emitted by the bank note 2'.

In the data memory 7 as data are stored, inter alia, calibration data for the sensor to be tested, for example about the expected fluorescence ability, which the sensor can use for the calibration after the readout and execution of the test.

The invention claimed is:

1. A test medium for at least one of testing, adjusting and calibrating at least one sensor for sensing documents of value, the sensor having a test device, wherein the test medium comprises an electronic data memory storing data for testing the sensor, and wherein the test medium further comprises a data interface arranged to transfer data from the electronic data memory to the test device of the sensor, and wherein the test medium has a card or a sheet-shaped carrier.

2. The test medium according to claim 1, wherein the data specify, which at least one property of the sensor is to be tested with the help of the test medium and/or with which test algorithms and/or rest parameters the test algorithms are to be automatically executed and/or which sensors were already precedingly checked with the test medium and/or with which result which sensors were already precedingly checked with the test medium.

3. The test medium according to claim 1, wherein the data include either the entire or at least parts of either or both the test algorithm and test parameters which are used for testing the sensor.

4. The test medium according to claim 1, wherein the test medium has a plurality of different partial areas which are provided with different properties checkable by the sensor.

5. The test medium according to claim 1, wherein the test medium comprises a bank note, on or in which the data memory is applied or incorporated.

6. An apparatus for use with a sensor for documents of value, comprising a device for at least one of testing, adjusting and calibrating the sensor using a test medium comprising an electronic data memory according to claim 1, wherein the test device has a data interface for transferring data either or both from and to the test medium through the data interface of the test medium, wherein the sensor is part of the apparatus and the sensor is adapted to measure machine readable properties of the test medium.

7. A method for operating the apparatus according to claim 6, comprising the steps:

providing a test medium according to claim 1;

transmitting data from the test medium through the data interface of the test medium to the test device through the data interface of the test device; and testing the sensor based upon the transmitted data.

8. The method according to claim 7, wherein data about at least one of the executed sensor tests and the sensor tests to be executed are transmitted from the test device to the test medium and are stored in the electronic data memory of the test medium.

* * * * *